United States Patent [19]

Porter, Jr.

[11] Patent Number: 5,222,533
[45] Date of Patent: Jun. 29, 1993

[54] NOZZLE FOR USE IN A CATALYST UNLOADER

[75] Inventor: Troy G. Porter, Jr., Gonzales, La.

[73] Assignee: BASF Corporation, Parsippany, N.J.

[21] Appl. No.: 595,164

[22] Filed: Oct. 10, 1990

[51] Int. Cl.$^5$ .............................................. B08B 9/04
[52] U.S. Cl. ........................................ 141/65; 141/7; 141/91; 134/167 C; 15/245; 4/255.09
[58] Field of Search ................. 141/1.7, 65, 89, 91; 4/256; 134/167 C, 168 C, 169 C; 239/DIG. 13; 15/345, 347

[56] References Cited

U.S. PATENT DOCUMENTS

| | | | |
|---|---|---|---|
| 3,646,947 | 3/1972 | Rochelle et al. | 134/167 C |
| 3,754,580 | 8/1973 | Perry | 141/65 |
| 3,850,207 | 11/1974 | Loliger et al. | 141/90 |
| 3,916,960 | 11/1975 | Thompson | 141/1 |
| 4,119,114 | 10/1978 | Bolton et al. | 15/345 X |
| 4,756,324 | 7/1988 | Larsson | 134/167 C |
| 4,997,443 | 2/1991 | Buchert | 134/167 C |

FOREIGN PATENT DOCUMENTS 2310259 7/1977 France ................................ 141/91

Primary Examiner—Ernest G. Cusick

[57] ABSTRACT

A nozzle is provided for use in discharging a controlled stream of fluid into a reactor tube of a catalyst unloading apparatus for removing non-packed, non-bridging, and packed bridging flowable catalyst and bead material from within the reactor tube. The nozzle has a main channel running medially along its length for entry and exit of the controlled fluid, and a plurality of unevenly spaced smaller fluid discharge openings positioned around the circumference of the nozzle at such an angle to the central axis of the nozzle so as to discharge some of the controlled fluid in an upward and sideward thrusting manner, such that a sideward and downward thrust is exerted against the nozzle, thereby forcing the nozzle to position itself in a downward manner against the side of the reactor tube. This action allows both the catalyst and the bead material to be removed in one continuous operation.

5 Claims, 2 Drawing Sheets

NOZZLE FOR USE IN A CATALYST UNLOADER

BACKGROUND OF THE INVENTION

This invention relates to the field of unloading devices for removing catalyst and beads from within the tubes of a multi-tube reactor. More particularly, this invention relates to improved nozzles for use in such devices.

In unloading flowable granular or particle catalyst from the tubes of a multi-tube reactor, difficulties have been encountered in removing catalyst that has become lodged within the tubes during reactor operation. In some previous instances, the particle catalyst completely blocked or bridged some or all of the tubes of the reactor due to the size and configuration of the catalyst or the support and inert beads used to hold the catalyst in place. This type of bridging or blocking impedes movement or flow of the catalyst and beads from the tubes of the reactor.

U.S. Pat. No. 3,916,960 has addressed the problem of removing the catalyst from such reactor tubes utilizing an apparatus comprising a head positionable adjacent open ends of a plurality of reactor tubes for creating a pressure differential in the reactor tubes for flowing the catalyst from the reactor tubes into a chamber formed by the head. However, because of the configuration of this apparatus, before it can be used, the reactor head must be removed so that adequate head space is available. Secondly, this apparatus has the disadvantage of not being able to remove either the larger size support beads used to hold the catalyst support material, nor the inert beads which are immediately adjacent to the catalyst. Both of these must be removed manually before the apparatus of U.S. Pat. No. 3,916,960 may be used to remove the catalyst.

Therefore, a means for removing catalyst from within the tubes of a multi-tube reactor whereby the top head of the reactor would not need to be removed, and whereby all of the material contained in the reactor tube including catalyst, inert and support beads could be removed in a one-step process would constitute a significant improvement over the prior art.

SUMMARY OF THE INVENTION

In a catalyst unloading apparatus used for removing, non-bridging, and non-packed, and packed, bridging flowable catalyst and bead material from within the reactor tubes of a multi-tube reactor wherein said apparatus has a head adapted for positioning adjacent an open end of the catalyst filter reactor tube for effecting the unloading of the catalyst and bead material and a means for effecting a pressure differential, and a means for discharging a controlled stream of fluid into the reactor tube, the present invention is an improvement comprising a nozzle at the end of said means for producing a controlled stream of fluid into the reactor tube. Said nozzle has a main channel running medially along its length for entry and exit of the controlled fluid, and a plurality of smaller fluid discharge openings positioned eccentrically around the circumference at such an angle to the central axis of the nozzle so as to discharge some of the controlled fluid in an upward and sideward thrusting manner, such that a sideward and downward thrust is exerted against said nozzle, thereby forcing the nozzle to position itself in a downward manner against the side of said reactor tube and allowing both the catalyst and the bead material to be removed in one continuous operation.

DESCRIPTION OF THE PREFERRED EMBODIMENTS

Figure 1:
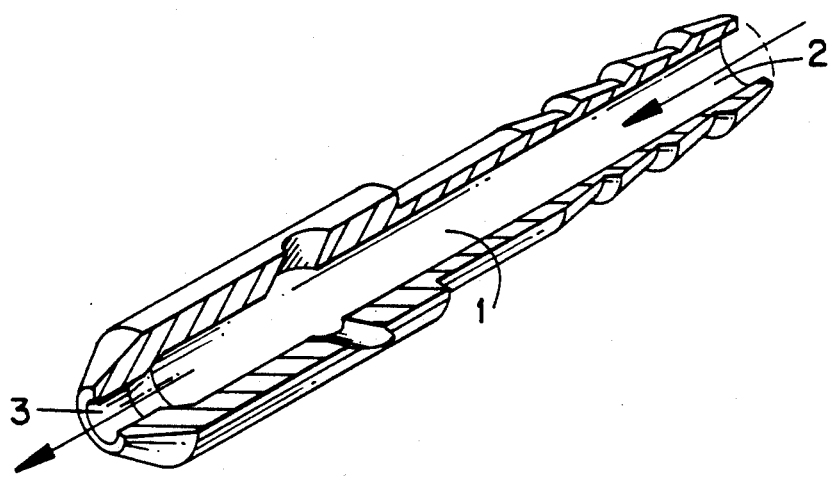
FIG. 1 is an cut-away view of the improved self-positioning nozzle of the present invention.
Figure 2:
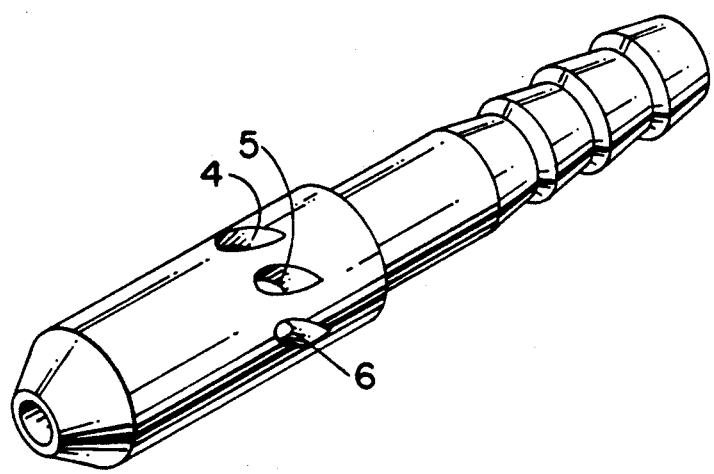
FIG. 2 is an isometric view of the improved self-positioning nozzle of the present invention.
Figure 3:
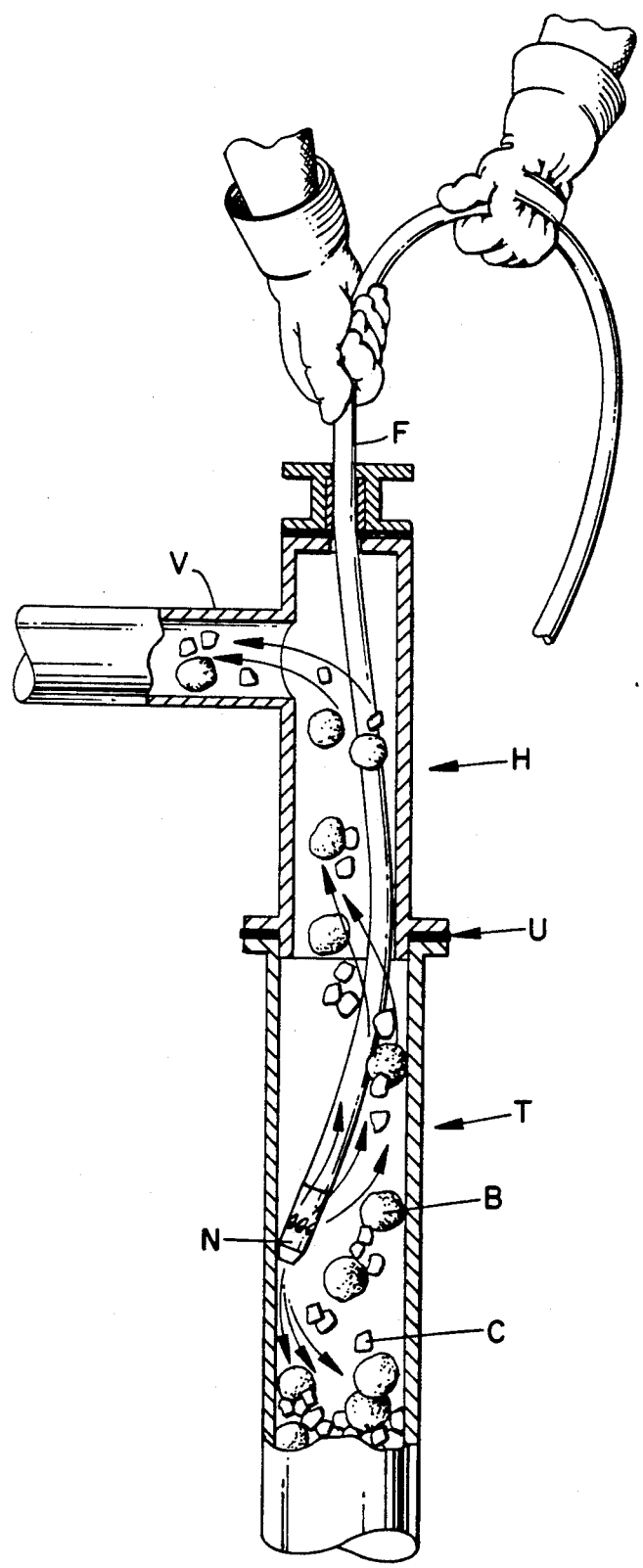
FIG. 3 is a side-view of a reactor tube with the present invention positioned for unloading beads and catalyst therefrom.

An improved catalyst unloader apparatus used for removing non-packed, non-bridging, and packed, bridging flowable catalyst (C) and beads (B) from within a reactor tube (T), wherein said apparatus contains a head (H) adapted for positioning adjacent an opened end of the catalyst filter reactor tube (U) for effecting unloading of the catalyst; a means (V) associated with said head for effecting a pressure differential in the reactor tube for flowing the catalyst and bead material from the reactor tube to said head and a means (F) with said head for discharging a controlled stream of fluid into the reactor tube for dislodging packed, bridging catalyst and bead material lodged in the reactor tube wherein the catalyst and bead material is unloaded from the reactor tube by said means effecting a pressure differential (V), the improvement characterized as a nozzle (N) at the end of said means (F) for producing a controlled stream of fluid into the reactor tube (FIG. 3) wherein said nozzle has a main channel 1 running through the said nozzle for entry 2 and exit 3 of the control fluid (FIG. 1), and a plurality of smaller fluid discharge openings 4, 5, 6 (FIG. 2), said openings being unevenly distributed around the circumference of said nozzle and positioned at an angle such as to discharge some of the fluid in an upward and sideward thrusting manner such that a sideward and downward thrust is exerted against said nozzle, thereby forcing the nozzle to position itself in a downward manner against the side of said reactor tube and allowing both the catalyst and bead material to be removed in one continuous operation.

While it is normally contemplated the fluid carrying the particle catalyst and beads from the tubes will be air, the use of other gases or fluids compatible with positioning beads B and catalyst C is clearly within the scope of the present invention.

What is claimed is:

1. A nozzle suitable for use in discharging a controlled stream of fluid into a reactor tube of a catalyst unloading apparatus for removing non-packed, non-bridging, and packed bridging flowable catalyst and bead material from within the reactor tube, said nozzle comprising:

a main channel running medially along the length of said nozzle for entry and exit of the controlled fluid; and a plurality of unevenly spaced smaller fluid discharge openings positioned around the circumference of said nozzle at such an angle to the central axis of the nozzle so as to discharge some of the controlled fluid in an upward and sideward thrusting manner, such that a sideward and downward thrust is exerted against said nozzle, thereby forcing the nozzle to position itself in a downward manner against the side of the reactor tube and allowing both the catalyst and the bead material to be removed in one continuous operation.

2. A nozzle according to claim 1, wherein said fluid discharge openings are substantially tear-shaped.

3. A nozzle according to claim 1, wherein said nozzle has three or less fluid discharge openings.

4. A nozzle according to claim 1, wherein said nozzle has more than three fluid discharge openings.

5. A method for unloading non-packed, non-bridging and packed, bridging flowable particle catalyst and bead material from the opened end of a reactor tube which comprises utilizing the nozzle of claim 1.

* * * * *